United States Patent [19]
Ahuja

[11] Patent Number: 6,122,732
[45] Date of Patent: Sep. 19, 2000

[54] SYSTEM MANAGEMENT INTERRUPT FOR A DESKTOP MANAGEMENT INTERFACE/SYSTEM MANAGEMENT BASIC INPUT OUTPUT SYSTEM INTERFACE FUNCTION

[75] Inventor: Sanjay Ahuja, Cypress, Tex.

[73] Assignee: Compaq Computer Corporation, Houston, Tex.

[21] Appl. No.: 09/178,523

[22] Filed: Oct. 23, 1998

[51] Int. Cl.[7] ...................................................... G06F 9/00
[52] U.S. Cl. .............................................. 713/1; 713/100
[58] Field of Search ........................................ 713/1, 100

[56] References Cited

U.S. PATENT DOCUMENTS

| | | | |
|---|---|---|---|
| 5,339,437 | 8/1994 | Yuen | 395/700 |
| 5,579,522 | 11/1996 | Christeson et al. | 713/2 |
| 5,724,027 | 3/1998 | Shipman et al. | 340/825.31 |
| 5,835,594 | 11/1998 | Albrecht et al. | 380/23 |
| 5,854,937 | 12/1998 | Woodward | 712/1 |
| 5,878,256 | 3/1999 | Bealkowski et al. | 395/712 |
| 5,930,504 | 7/1999 | Gabel | 395/712 |

OTHER PUBLICATIONS

*Am291F002T/Am29F002B, 2 Megabit (262,144×8–Bit) CMOS 5.0 Volt–only, Sector Architecture Flash Memory*, Advanced Micro Devices, Inc., © 1996, pp. 1–34.

*Intel486™ SL Microprocessor SuperSet Programmer's Reference Manual, System and Power Management*, Intel Corporation, Nov. 1992, pp. 6–28 through 6–53.

*Pentium™ Processor User's Manual, vol. 3: Architecture and Programming Manual*, Intel Corporation, © 1994, pp. 20–1 through 20–9.

*System Management BIOS Reference Specification*, Version 2.3, Desktop Management Task Force, Inc., Aug. 12, 1998, 97 pp..

*Primary Examiner*—Dennis M. Butler
*Attorney, Agent, or Firm*—Akin, Gump, Strauss, Hauer & Feld, LLP

[57] ABSTRACT

A computing system provides a process for updating a management information format (MIF) database while a processor is operating in a protected mode. The BIOS accesses a protected memory space by utilizing a system management interrupt (SMI). A SMI causes the computing system to enter a system management mode (SMM) and call a Basic Input Output System (BIOS) function, such as the BIOS function 52h (Set Structure), to accomplish an update of the MIF database. An OEM string, for example, may be updated. In SMM, the system is capable of accessing the entire memory address space without risking a memory protection fault.

20 Claims, 6 Drawing Sheets

400

| OFFSET | NAME | LENGTH | VALUE | DESCRIPTION |
|---|---|---|---|---|
| 00h | TYPE | BYTE | 11 | STRUCTURE INDICATOR |
| 01h | LENGTH | BYTE | 5h | LENGTH OF RECORD |
| 02h | HANDLE | WORD | VARIES | UNIQUE NUMBER ALLOCATED TO STRUCTURE |
| 04h | COUNT | BYTE | VARIES | NUMBER OF STRINGS |

| OFFSET | NAME | LENGTH | VALUE | DESCRIPTION |
|---|---|---|---|---|
| 00h | TYPE | BYTE | 11 | STRUCTURE INDICATOR |
| 01h | LENGTH | BYTE | 5h | LENGTH OF RECORD HEADER |
| 02h | HANDLE | WORD | 000Bh | UNIQUE NUMBER ALLOCATED TO STRUCTURE |
| 04h | COUNT | BYTE | 01h | NUMBER OF STRINGS |
| 05h | DATA | 7 BYTES | "compaq", 00h | NULL TERMINATED STRING |

| ADDRESS | DATA | DESCRIPTION |
|---|---|---|
| FFFF8000h | 43h | ASCII "C" |
| FFFF8001h | 6Fh | ASCII "o" |
| FFFF8002h | 6Dh | ASCII "m" |
| FFFF8003h | 70h | ASCII "p" |
| FFFF8004h | 51h | ASCII "a" |
| FFFF8005h | 71h | ASCII "q" |
| FFFF8006h | 00h | NULL CHARACTER |

*FIG. 4C*

SYSTEM MANAGEMENT INTERRUPT FOR A DESKTOP MANAGEMENT INTERFACE/ SYSTEM MANAGEMENT BASIC INPUT OUTPUT SYSTEM INTERFACE FUNCTION

BACKGROUND OF THE INVENTION

1. Field of the Invention

The present invention relates generally to a method of updating protected memory areas of a computing system while a processor is in a protected mode and, more particularly, to a method for updating a Desktop Management Interface/System Management Basic Input/Output System (DMI/SMBIOS) portion of flash read-only memory (ROM) of a computing system using a Basic Input/Output System BIOS function 52h (Set Structure) call and a system management interrupt (SMI).

2. Description of the Related Art

In the past decade, the computer industry has grown with breathtaking speed. Not only have the number and types of computers grown exponentially, but also new computer configurations, software products and peripheral devices have proliferated.

In parallel with, and perhaps as the result of, the increase of computers, the amount of accessible information has also exploded. As a result, there is a corresponding need for computers to share information and so, increasingly, computers are networked together. The trend of increasing numbers of computers, software and related devices and the trend of increased computer networking have exacerbated the need for information standards and computer components that both work as manageable, cohesive units and are also able to self-configure, self-adjust and communicate with each other and the user.

In an effort to enable computer systems to cooperate effectively, the Desktop Management Task Force (DMTF) was created in 1992 by a number computer equipment vendors such as Intel Corporation of Santa Clara, Calif., Microsoft Corporation of Redmond, Wash., Novell Corporation of Provo, Utah, SunSoft Corporation of Mountain View, Calif. and SynOptics Communications Corporation of Santa Clara, Calif. The DMTF set out to develop a cooperative strategy for managing the resources of desktop computer systems. In October 1993, the DMTF released a developers' version of what is presently termed the Desktop Management Interface/System Management Basic Input/Output System (DMI/SMBIOS). DMI/SMBIOS was the computer industry's first protocol and operating system (OS) independent application program interface (API) for managing the personal computer (PC). In conjunction with DMI/SMBIOS, the DMTF defined a management information format (MIF), a common format for information shared by systems utilizing DMI/SMBIOS.

Using MIF and DMI/SMBIOS, a system administrator can query a MIF database of a computer system and determine the software and hardware configuration of the system easily and quickly. The MIF database contains all information about the computer system and its components. This facility simplifies common administrative procedures such as the installation of new software and hardware, the diagnosis of problems and the implementation of solutions to those problems. In conjunction with standard network communication protocols such as the Simple Network Management Protocol (SNMP), DMI/SMBIOS also works on computers that are connected to a computer of an administrator by means of a local area network (LAN). In this way, a technician or LAN administrator can remotely determine the behavior at another computer.

Among other things, access to the MIF database is influenced by the nature of memory within a computer system. Memory within a computer system can be classified into one of two types, volatile memory and non-volatile memory. Volatile memory is memory that loses its contents whenever power to the computer system is turned off. An example of volatile memory is a random access memory (RAM). In contrast, non-volatile memory retains its contents when power to the computer system is turned off. In a computer system, non-volatile memory is typically a form of read-only memory (ROM) and volatile memory is typically a form of random access memory (RAM).

When a computer system is turned on, it must retrieve a basic input output system (BIOS) from non-volatile memory, often a ROM device termed ROM BIOS. A major disadvantage of ROM BIOS is that it must be loaded into the ROM device when the computer system is manufactured, making the ROM BIOS difficult to update when new types of devices are added to the computer system. To address this problem, current computer systems often contain flash ROM, a type of non-volatile memory that, unlike standard ROM, can be altered after it has been installed. Flash ROM enables BIOS to be updated whenever necessary, providing more flexibility when adding components or otherwise changing a system configuration of a computer system. One limitation of flash ROM is that the contents must be altered in blocks instead of individual bytes as is common with other memory devices such as RAM and hard disk drives.

SUMMARY OF THE INVENTION

In accordance with the present invention, a computing system provides a method of updating information in a management information format (MIF) database within the computing system even when a processor is operating in a protected mode. The MIF database is maintained by a service layer of a Desktop Management Interface/System Management Basic Input/Output System (DMI/SMBIOS) for the computing system. An application that needs to update the MIF database must present a request to the service layer in the form of an Application Programming Interface (API) because the database is typically within a protected memory space of a flash ROM. However, when the Basic Input Output System (BIOS) needs to update the MIF database directly a couple of problems have typically arisen.

A minimum block of flash ROM had to be erased to update even a byte of information. As a result, BIOS needed a work buffer area with enough space to store all the information in the particular block. Typically, the work area recommended by DMI/SMBIOS specifications has not been sufficient. Therefore, BIOS often required the use of memory such as a disk drive to perform the an update function. Although non-volatile memory can be located anywhere in memory space, an attempt by BIOS to access memory space has at times caused a memory protection fault by violating memory access rights set by an operating system (OS).

In accordance with the present invention, during a manufacturing process for the computing system, BIOS may access a protected memory space by triggering a system management interrupt (SMI). The SMI causes the OS to enter a system management mode (SMM). In SMM, the processor is capable of accessing the entire memory address space without risking a memory protection fault. In addition, the entry into SMM enables BIOS to make use of system management memory (SMRAM) that is reserved for the SMM, alleviating the problem of limited work buffer area. A SMI handler routine calls a DMI/SMBIOS function, such as function 52h (Set Structure), to update an original equipment manufacturer (DEM) string or other database information.

BRIEF DESCRIPTION OF THE DRAWINGS

A better understanding of the present invention can be obtained when the following detailed description of the preferred embodiment is considered in conjunction with the following drawings, in which:

FIG. 4A is an illustration of a standard DMI/SMBIOS data structure;

FIG. 4B is an example of the contents of a typical DMI/SMBIOS data record in accordance with the DMI/SMBIOS data structure of FIG. 4A;

FIG. 4C is an example of the contents of a DMI/SMBIOS data record based on the DMI/SMBIOS data structure of FIG. 4B in accordance with the present invention;

DETAILED DESCRIPTION OF PREFERRED EMBODIMENT

This application is related to the following copending and commonly assigned United States patent applications which are hereby incorporated by reference as if set forth in their entirety:

U.S. patent application Ser. No. 09/070,866, entitled "A METHOD FOR FLASHING ESCD AND VARIABLES INTO A ROM" to Mark A. Piwonka, Louis B. Hobson, Jeffrey D. Kane, and Randall L. Hess; and U.S. patent application Ser. No. 09/070,823, entitled "METHOD OF FLASH PROGRAMMING OR READING A ROM OF A COMPUTER SYSTEM INDEPENDENTLY OF ITS OPERATING SYSTEM" to Patrick L. Gibbons and Paul J. Broyles III.

Figure 1:
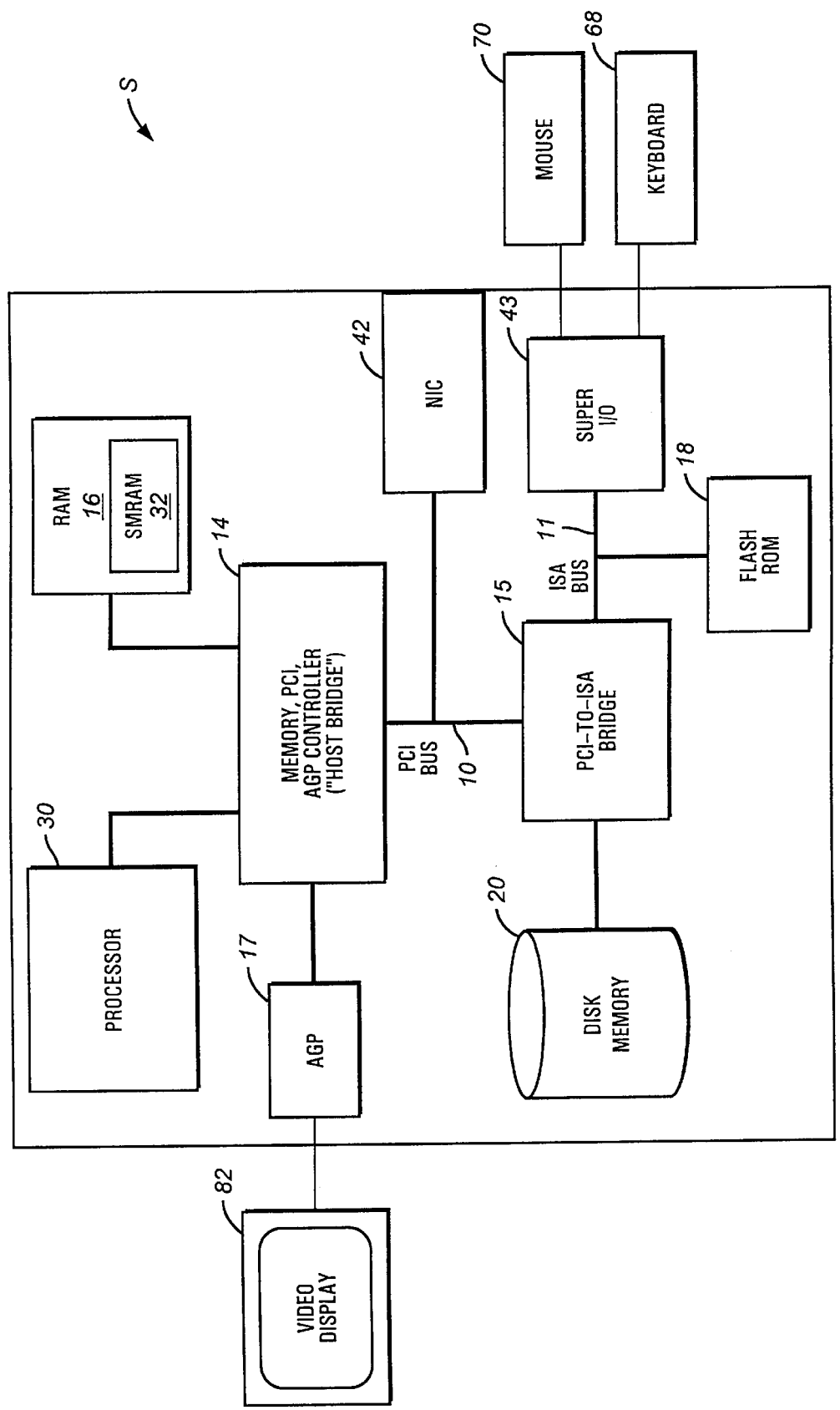
FIG. 1 is a block diagram of a typical computing system incorporating flash ROM.

Turning to FIG. 1, illustrated is a typical computing system S according to the present invention. The computing system S in the illustrated embodiment is a PCI bus based machine, having a peripheral component interconnect (PCI) bus 10. The PCI bus 10 is controlled by PCI controller circuitry located within a memory/accelerated graphics port (AGP)/PCI controller 14. This controller 14 (the "host bridge") couples the PCI bus 10 to a processor 30 and a AGP 17. The processor 30 is a system management mode (SMM) processor.

The host bridge 14 in the disclosed embodiment is a 440LX Integrated Circuit by Intel Corporation, also known as the PCI AGP Controller (PAC). The processor 30 is preferably a Pentium Pro, manufactured by the Intel Corporation of Santa Clara, Calif. The processor 30 could be replaced with a different processor, other than the Pentium Pro, without detracting from the spirit of the invention.

The host bridge 14 includes interface circuitry for system random access memory (RAM) 16. The system RAM 16 preferably supports extended data out (EDO) dynamic random access memory (DRAM) and/or synchronous DRAM (SDRAM). The system RAM 16 contains a memory area which serves as a system management random access memory (SMRAM) 32. The SMRAM 32 is only accessible in the system management mode (SMM) of the computing system S.

The PCI bus 10 couples a variety of devices that generally take advantage of a high-speed data path. This includes a network interface controller (NIC) 42, which preferably supports the ThunderLan™ power management specification by Texas Instruments, and an AGP 17. In another embodiment of the invention, the NIC 42 might be in addition to or replaced by an Advanced Digital Subscriber Line (ADSL) or cable modem. A video display 82 is connected to the AGP 17. Also coupled to the PCI bus 10 is a PCI-to-ISA (PTI) bridge 15.

The PTI bridge 15 contains circuitry that couples the PCI Bus 10 to an Industry Standard Architecture (ISA) bus 11. Coupled to the ISA bus 11 is a disk memory device 20, a conventional super I/O chip 43 and a flash ROM device 18. The ROM device 18 may be of any type. The flash ROM 18 contains BIOS code 160 and SMI handler code 155. In addition, a mouse 70 and a keyboard 68 are coupled to the super I/O port 43, enabling human interaction with the computer system S through the host bridge 14.

The computing system S illustrates only one platform in which a system according to the present invention can be implemented. The disclosed techniques can, without distracting from the spirit of the invention, be implemented in many systems that contain flash ROM, regardless of whether the system contains less, additional, or different components than the system shown in FIG. 1. The computing system S may be any of a wide variety of consumer devices or information appliances such as consumer boxes, computer system/TVs, computer systems, and game machines, for example.

Figure 2:
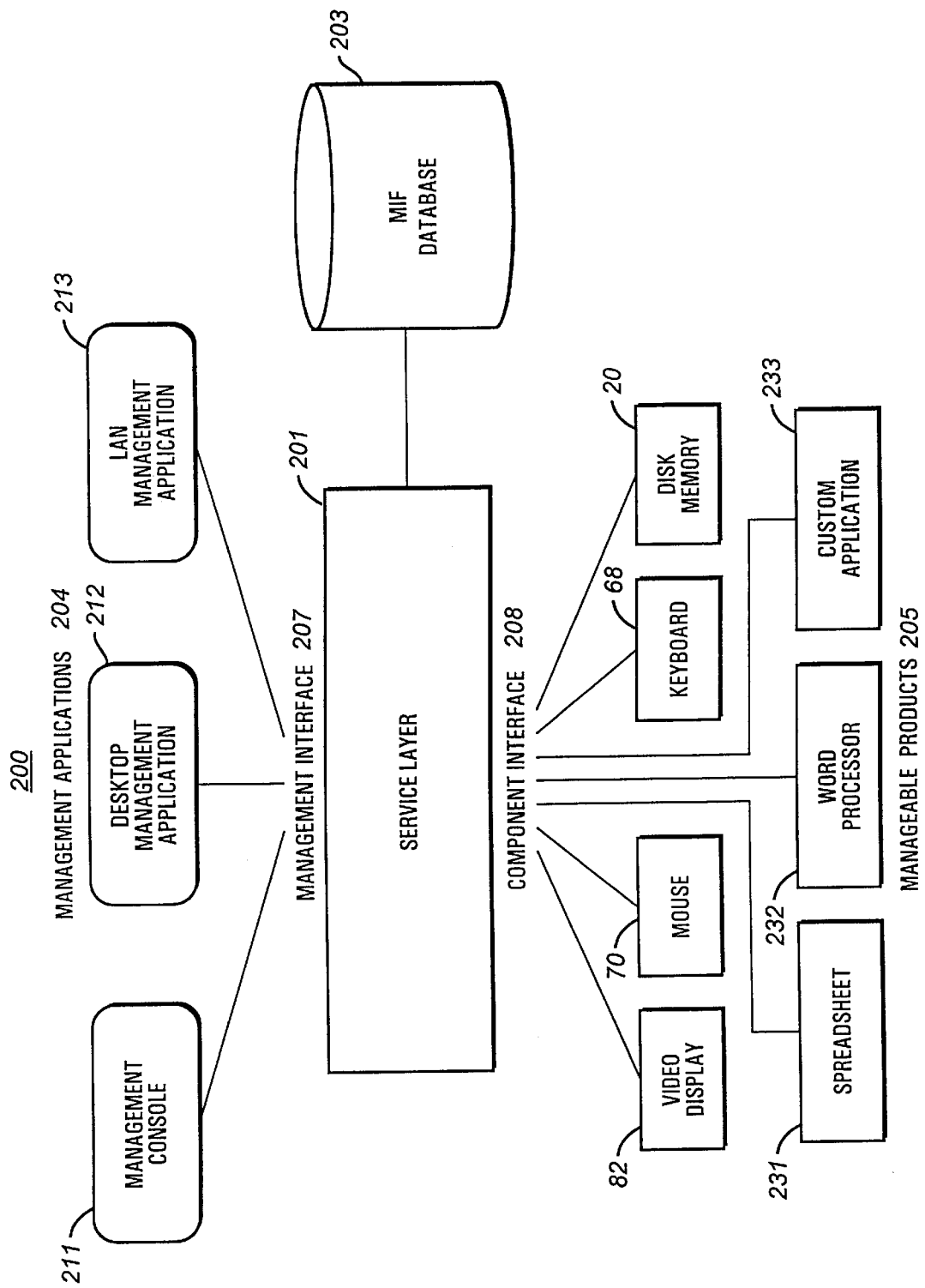
FIG. 2 is a block diagram of an exemplary DMI/SMBIOS architecture for the computing system of FIG. 1.

Turning now to FIG. 2, illustrated is the architecture of a Desktop Management Interface/System Management Basic Input/Output System (DMI/SMBIOS) 200. Data for the DMI/SMBIOS 200 is stored in a MIF database 203. Typically, the MIF database 203 is stored in a non-volatile memory area such as the flash ROM 18. Both read and write requests of the MIF database are handled through a service layer 201.

The service layer includes a management interface 207 and a component interface 208. The management interface 207 provides Application Programming Interfaces (APIs) for management applications 204 such as a management console 211, a desktop management application 212 and a local area network (LAN) management application 213. The component interface 208 provides APIs for manageable products 205 such as the video display 82, the mouse 70, the keyboard 68 and the disk memory 20. In addition, the component interface 208 provides APIs for other manageable products 205 such as a spreadsheet application 231, a word processor application 232, and a custom application 233.

Other devices that adhere to the DMI/SMBIOS conventions might also be part of the manageable products 205. For example, in another embodiment, the computing system S may contain a printer or a CD-ROM drive (not shown). Manageable components 205 are able to access and register with the service layer 201 through the component interface 208. Registration with DMI/SMBIOS implies that information about a registered device is stored in the MIF database 203 for informational and automatic configuration purposes.

The management console 211 and the desktop management application 212 are typically used for requests local to the computing system S. The LAN management application 213 typically provides access to the service layer 201 for requests that might be received on the NIC 42 from other computing systems using a standard network communication protocol such as Simple Network Management Protocol (SNMP).

Figure 3:
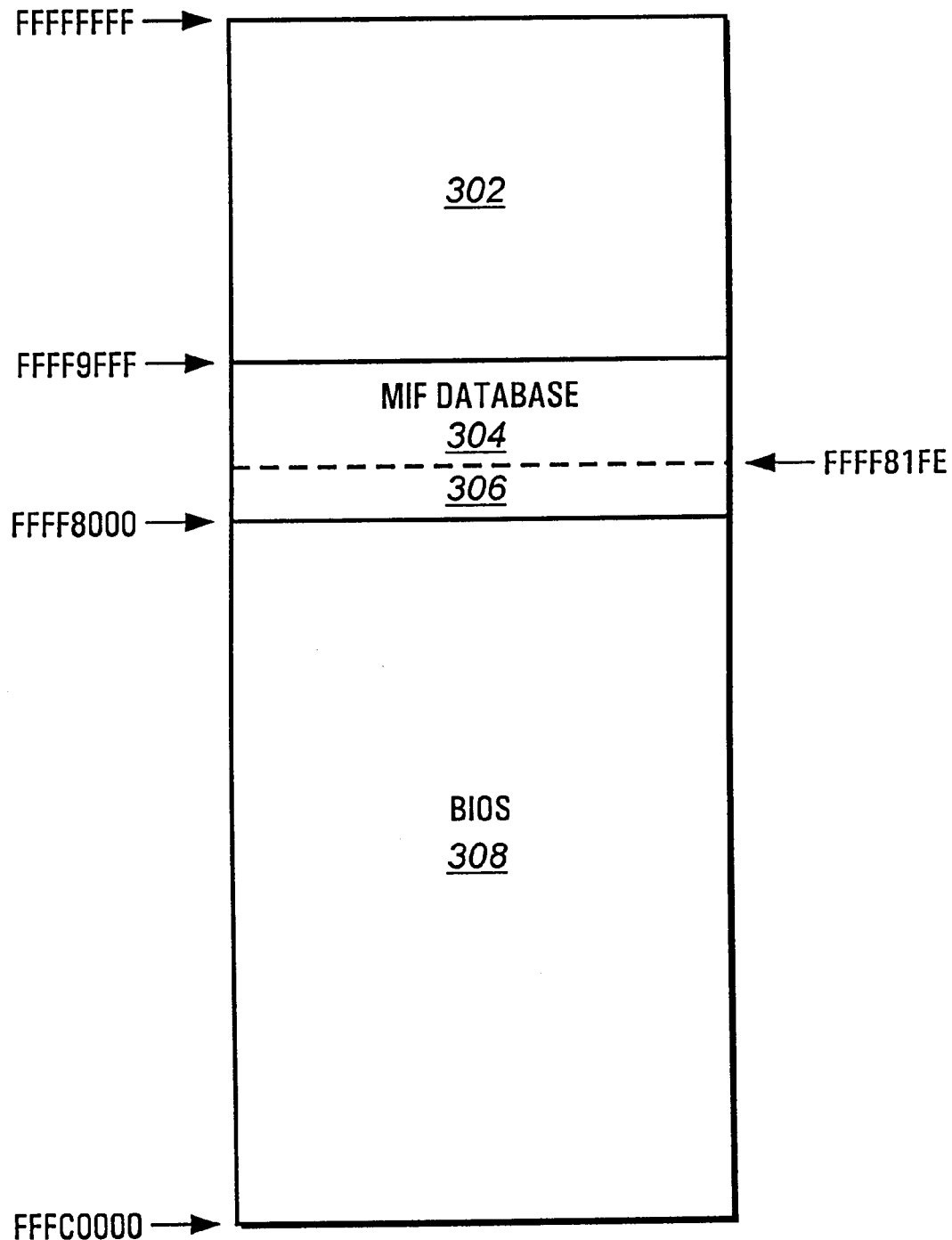
FIG. 3 is a illustration of an exemplary memory space for the flash ROM of FIG. 1.

Turning now to FIG. 3, illustrated is a 256 kilobyte (K) portion 300 of the flash ROM device 18. The memory block 300 includes a 24K block 302 from hexadecimal address FFFF9FFF to FFFFFFFF, an 8K block 304 from address FFFF8000 to FFFF9FFF, and a 224K block 308 from address FFFC0000 to FFFF8000. Within the 8k block 304, there is a 510 byte block 306 from hexadecimal address FFFF8000 to FFFF81FE. For the purposes of the present invention, the memory block 300 represents the portion of the flash ROM 18 where the BIOS code is stored, and the 510 byte block 306 represents the portion of the flash ROM 18 where the MIF database is stored, including a original equipment manufacturer (OEM) strings table to be updated. Typically, a flash ROM device cannot update blocks of memory smaller than a 8K block. Therefore, to update the 510 byte block 306, the entire 8K block 304 has to be overwritten.

Turning now to FIGS. 4A and 4B (tables 400 and 401 respectively), illustrated are structures of a data record in an OEM string table that may be found stored in the flash ROM device 18. The first four rows of FIGS. 4A and 4B contain the definitions of data fields that make up a record for the data record with the table 400 describing what the data structure is comprised of and table 401 illustrating actual values that might be contained in the data structure.

The first column in both table 400 and 401, labeled "OFFSET," represents the number of bytes within each record that the corresponding data field will occupy. For example, the value "00h" in row 1 indicates that the data field defined by row 1 has an offset of zero bytes within the field.

The second column in both table 400 and 401, labeled "NAME," provides the name of the corresponding data field. For example, the name of the data field defined by row 1 is "TYPE." The other data field names include "LENGTH", "HANDLE", 'COUNT", and, in the case of table 401, "DATA". The first four rows in both table 400 and 401 corresponding to LENGTH indicates the length in bytes of the record header. The row corresponding to HANDLE indicates the handle of the record. The handle is a unique number that may be assigned to each record by DMI/SMBIOS. The row corresponding to COUNT indicates the number of strings of a particular structure type that the MIF database 203 contains. The row corresponding to DATA in table 401 describes the data in the record. The third column in row 5, column 3 of table 401, labeled "LENGTH," provides the length, in bytes, of the corresponding data field. In the case of row 1, the corresponding data field, named "TYPE," is one byte or eight bits long. The VALUE field in row 5 of table 401 is of length 7 bytes. This value varies depending upon the length of the data stored in the data record.

The fourth column, labeled "VALUE," provides an exemplary value of the corresponding data field. For example, the data field in row 1, column 4 indicates a type 11 or OEM STRINGS structure. A description of this data structure is provided in the DMI/SMBIOS Specification version 2.3 which is hereby incorporated by reference as is set forth in its entirety. The value "5h" in the second row of column 4 indicates that the length of the type 11 header (area of structure before actual data, or the area described in the first four rows of the data record) is five bytes. The value "000Bh" in row 3, column 4 of table 401 is an example of a unique handle allocated to the structure. The value "01h" in row 4, column 4 indicates that there is only one string of type 11 in the MIF database. The values "Compaq" and "00h" represent a NULL terminated string that is contained within the 7 bytes of this data field.

The fifth and final column in tables 400 and 401, labeled "DESCRIPTION," contains a description of the information defined in the corresponding data field. For example, the data field defined by row 1 contains an indication of the type of data structure that the record represents. In the disclosed embodiment, the particular data structure is a type 11 or OEM string structure. The data field defined by row 2 contains the length of the record header. The data field defined by row 3 contains the unique handle allocated to the structure. The data field defined by row 4 contains the number of strings in the structures. The data field defined by row 5 indicates the null terminated string.

Turning now to FIG. 4C, illustrated is a table 402 that contains the contents of a data record in the 510 byte block 306 pointed to by the example data record defined in table 400. The first column, labeled "ADDRESS," contains the address of a one byte location within the 510 byte block 306. The second column, labeled "DATA," contains a example of a value that might be stored in the one byte memory location specified in the corresponding row of column 1. The third column contains an English language description of the value specified in the corresponding row of column 2.

In the example illustrated in table 401, the memory location FFFF8000h of the 510 byte block 306 contains the letter "C". The memory locations FFFF8001h–FFFF8005h contain the letters "o", "m", "p", "a" and "q" respectively. The memory location FFFF8006h contains the value "00h" which represents the NULL character and signals the end of the string stored in memory locations FFFF8000h–FFFF8005h. In other words, the memory locations FFFF8000h–FFFF8006h represent the string "Compaq", including a NULL character in memory location FFFF8006h to indicate the end of the string.

The foregoing description of data records is for illustration only; the data to be updated might be a data record of another format without departing from the spirit of the invention. Further, a portion of flash ROM 18 to be updated may contain unformatted data.

Figure 5A:
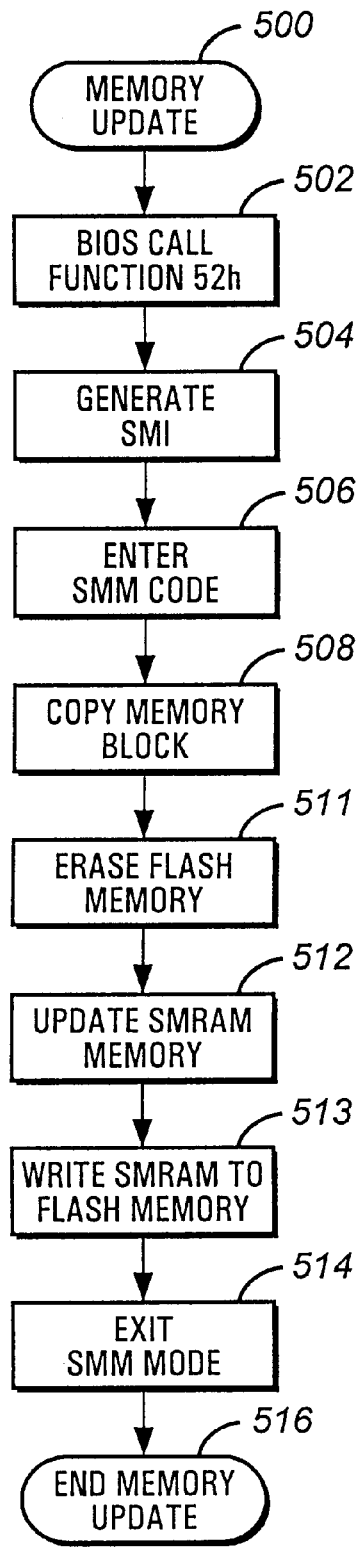
FIG. 5A is a flow chart of an update process for the flash ROM of FIGS. 1 and 3 with respect to information utilizing the DMI/SMBIOS structure of FIGS. 4A and 4B in accordance with the present invention.
Figure 5B:
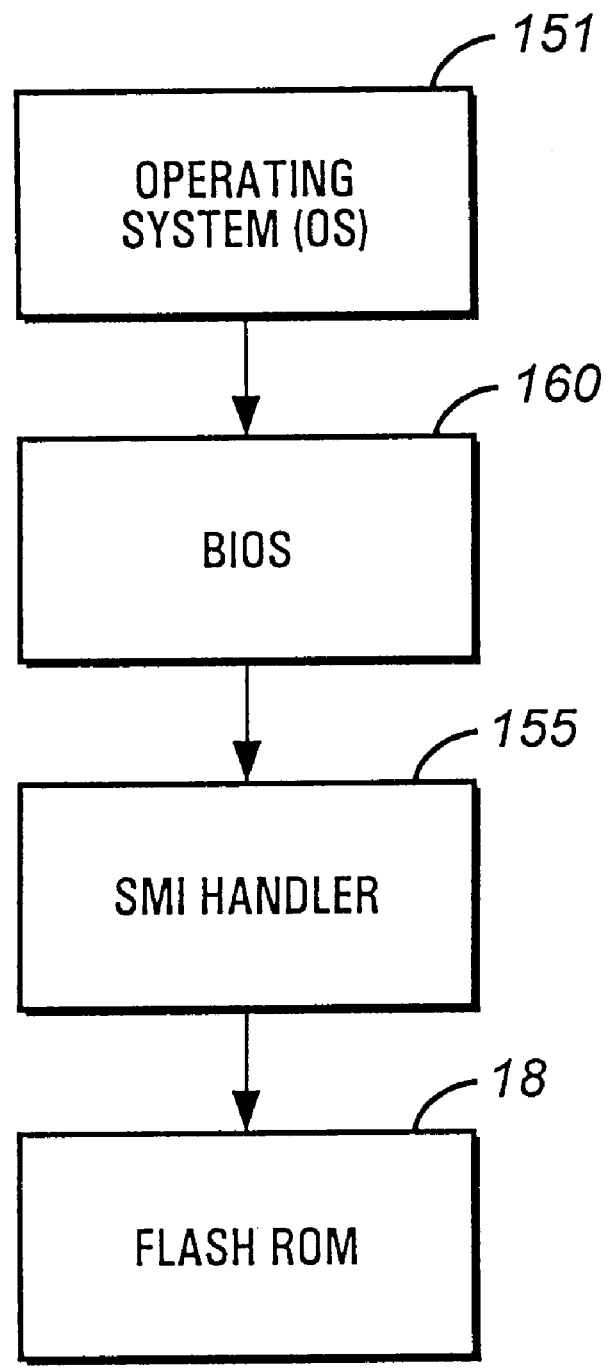
FIG. 5B is a control flow diagram for updating the flash ROM of FIGS. 1 and 3 in accordance with the present invention.

Turning now to FIG. 5A, illustrated is a flow chart showing a memory update process for the flash ROM 18 in accordance with the present invention. FIG. 5B which shows a control flow diagram in accordance with the present invention is described in conjunction with FIG. 5A. The update process 500 begins with a DMI/SMBIOS function 52h (Set Structure) call in step 502. An exemplary function prototype for the BIOS function 52h including calling parameters is defined below:

```
short FAR (*entryPoint) {
    short           Function;
    unsigned char FAR   *dmiDataBuffer;
    unsigned char FAR   *dmiWorkBuffer;
    unsigned char   Control;
    unsigned short  dmiSelector;
    unsigned short  BiosSelector
}.
```

The BIOS function represented is of type short FAR and utilizes the function pointer entryPoint to proceed to a location in memory to begin execution. The first calling parameter, Function, is of type short and indicates which BIOS function is being called, in this case 52H. The second calling parameter, dmiDataBuffer, is a FAR pointer to a data buffer containing new or change data. The third calling parameter, dmiWorkBuffer, is a FAR pointer to a work buffer area that the function can utilize. The fourth calling parameter, Control, is of type unsigned char and is used to control the operation of the function call depending upon which function is being called. The fifth calling parameter, dmiSelector, is of type unsigned short and contains a DMI/SMBIOS read/write selector. The sixth calling parameter, BiosSelector, is of type unsigned short and contains a BIOS readable/writeable selector. In the disclosed embodiment, the DMI/SMBIOS function 52h allows the operating system 151 to pass a modified or new OEM string to BIOS 160 (FIG. 5B).

Following step 502, the process 500 proceeds to step 504 where a System Management Interrupt (SMI) is generated. The SMI causes an operating system (OS) of the computing system S to enter a system management mode (SMM) in step 506. Upon entry into SMM, control is transferred from the BIOS 160 to the SMI handler routine 155 (FIG. 5B). The SMRAM 32, which serves as a BIOS work buffer area, is accessible to the SMI handler routine 155. In SMM, the SMI handler routine 155 has read and write access to the entire memory space of the computing system S including the 510 byte block 306 of the 256K portion 300 of the flash ROM device 18.

The SMI handler routine 155 now has the ability to update any part of the memory space of the computing system S including the 256K portion 300 of the flash ROM device 18. However, because of physical limitations of the flash ROM device 18, the smallest portion that can be updated is an 8K portion. Therefore, to update the 510 byte block 306, the processor 30 must update the entire 8K block 304 in which the 510 byte block 306 is contained. For this reason, the memory requirements of a typical MIF database update often exceeds the amount available for a standard update by the DMI/SMBIOS service layer 201.

The memory update 500 proceeds to step 508 where the entire 8K block 304 of the 256K portion 300 of the flash ROM device 18 is copied into the SMRAM 32, which is reserved for SMM operations. The SMRAM 32 thus contains a backup copy of the 8K block 304. Next, the processor 30 erases the 8K block 304 of the flash ROM device 18 in step 511. From step 511, control proceeds to step 512 where the copy of the 8K block 304 stored in the SMRAM 32 is updated. In the disclosed embodiment, the copy of the 8K block 304 stored in the SMRAM 32 is updated by writing a new or modified OEM string into the 8K block 304. Examples of information which might be contained in an OEM string include part numbers for reference documents and contact information for a manufacturer. The process next proceeds to step 513 where the updated copy of the contents of the 8K block 304 that is stored in SMRAM is written to the appropriate memory location in the flash ROM device 18. Steps 508–513 are performed by the SMI handler routine 155.

Finally, the computing system exits the SMM in step 514 returning control to the operating system 151. The memory update of the flash ROM device 18 in step 516. As illustrated in FIG. 5B, the operating system 151 calls the BIOS 160, the BIOS 160 generates the SMI placing the system in SMM such that control is transferred to the SMI handler 155, and the SMI handler 155 modifies the flash ROM 18.

While the disclosed embodiment provides the example of a BIOS function 52h, it should be understood that the present invention is applicable to other BIOS or DMI/SMBIOS functions as well. While the disclosed embodiment provides the example of updating an OEM string, it should be understood that the present invention may be utilized for updating other MIF database information and other information accessible through DMI/SMBIOS. While the disclosed embodiment provides the example of updating information using a BIOS function, it should further be understood that alternatively other DMI/SMBIOS or BIOS functions may be used to trigger a predetermined action.

The foregoing disclosure and description of the invention are illustrative and explanatory thereof, and various changes in the number of variables, number of parameters, order of steps, field sizes, data types, code elements, code size, connections, components, and circuitry, as well as in the details of the illustrated hardware and software and construction and method of operation may be made without departing from the spirit of the invention.

What is claimed is:

1. A method of updating a non-volatile memory in a computing system, the method comprising the steps of:

issuing a basic input output system (BIOS) function call;

generating a system management interrupt (SMI) in response to the BIOS function call;

entering a system management mode in response to the system management interrupt;

copying information from a non-volatile memory of the computing system to a system management memory;

erasing a portion of the non-volatile memory;

writing updated information from the system management memory to the portion of the non-volatile memory; and exiting the system management mode.

2. The method of claim 1, wherein the non-volatile memory comprises a flash read-only memory device.

3. The method of claim 1, wherein the BIOS function call comprises a BIOS 52h Set Structure function call.

4. The method of claim 1, wherein the BIOS function call comprises a function call for updating an original equipment manufacturer (OEM) string.

5. The method of claim 1, wherein the non-volatile memory contains a management information format database.

6. The method of claim 1, wherein the updated information is comprised of management information format data.

7. The method of claim 6, wherein the management information format data is comprised of a SMBIOS OEM strings structure.

8. The method of claim 1, further comprising the step of:

updating the information in the system management memory with a new original equipment manufacturer (OEM) string.

9. A computing system adapted for updating a non-volatile memory, comprising:
  a microprocessor;
  a volatile memory coupled to the microprocessor;
  a system management memory within the volatile memory;
  a non-volatile memory, storing:
    non-volatile memory updating code executable by the microprocessor to perform the steps of:
      issuing a basic input/output system (BIOS) function call;
      generating a system management interrupt (SMI) in response to the BIOS function call;
      entering a system management mode in response to the system management interrupt;
      copying information from the non-volatile memory to the system management memory;
      erasing a portion of the non-volatile memory;
      writing updated information from the system management memory to the portion of the non-volatile memory; and
      exiting the system management mode.

10. The computing system of claim 9, the code executable by the microprocessor to perform the further step of:
  updating the information in the system management memory.

11. The computing system of claim 9, wherein the non-volatile memory comprises a flash read-only memory.

12. The computer system of claim 9, the non-volatile memory comprising:
  a management information format database.

13. The computing system of claim 9, wherein the BIOS function call comprises a 52h Set Structure function call.

14. The computing system of claim 9, wherein the BIOS function call comprises a function call for updating an original equipment manufacturer (OEM) string.

15. The computing system of claim 9, wherein the information comprises an original equipment manufacturer (OEM) string.

16. A non-volatile memory executable by a microprocessor of a computing system, comprising:
  non-volatile memory updating code executable by the microprocessor to perform the steps of:
    issuing a system management basic input output system (BIOS) function call;
    generating a system management interrupt (SMI) in response to the BIOS function call;
    entering a system management mode of the computing system in response to the system management interrupt;
    copying information from the non-volatile memory to a system management memory of the computing system;
    erasing a portion of the non-volatile memory;
    writing updated information from the system management memory to the portion of the non-volatile memory; and
    exiting the system management mode.

17. The non-volatile memory of claim 16, the code executable by the microprocessor to perform the further step of:
  updating the information in the system management memory.

18. The non-volatile memory of claim 16, further comprising:
  a management information format database.

19. The non-volatile memory of claim 16, wherein the BIOS function call comprises a 52h Set Structure function call.

20. The non-volatile memory of claim 16, wherein the BIOS function call comprises a function call for updating an original equipment manufacturer (OEM) string.

* * * * *